United States Patent [19]
Engle

[11] 3,910,639
[45] Oct. 7, 1975

[54] COMMUTER CAR BRAKE SYSTEMS
[75] Inventor: Thomas H. Engle, Cape Vincent, N.Y.
[73] Assignee: General Signal Corporation, Rochester, N.Y.
[22] Filed: Nov. 1, 1974
[21] Appl. No.: 520,178

Related U.S. Application Data
[63] Continuation-in-part of Ser. No. 393,529, Aug. 31, 1973, and Ser. No. 480,441, June 17, 1974, Pat. No. 3,845,991.

[52] U.S. Cl. .................... 303/3; 303/15; 303/22 A
[51] Int. Cl.² .......................................... B60T 13/68
[58] Field of Search ................. 303/3, 13, 15–17, 303/20, 21 A, 21 AF, 21 B, 21 BE, 22 A, 22 R, 70

[56] References Cited
UNITED STATES PATENTS
3,761,137   9/1973   Green et al. ........................ 303/3
3,814,484   6/1974   Matthews et al. .................. 303/20
3,823,984   7/1974   Parfitt et al. ........................ 303/3

Primary Examiner—Duane A. Reger
Attorney, Agent, or Firm—Pollock, Philpitt and Vande Sande

[57] ABSTRACT

An electro-pneumatic brake system is disclosed for vehicles having axles with both friction and dynamic braking means and axles with friction braking means only, in which individual control valves responsive to a vehicle weight signal, a signal proportional to the dynamic braking and a friction brake pressure signal are used to apply essentially equivalent actuation pressures simultaneously to the friction brakes at all axles. Unique component arrangements are disclosed which reduce brake actuation times by minimizing pressure build-up times in the pneumatic lines of the system.

11 Claims, 4 Drawing Figures

COMMUTER CAR BRAKE SYSTEMS

CROSS-REFERENCE TO RELATED APPLICATIONS

This application is a continuation-in-part of my earlier application Ser. No. 393,529 filed Aug. 31, 1973 for BRAKING SYSTEM FOR A LIGHT RAIL VEHICLE and Ser. No. 480,441 filed June 17, 1974 for BRAKING SYSTEM FOR A LIGHT RAIL VEHICLE, now Pat. No. 3,845,991.

BACKGROUND OF THE INVENTION

The present invention relates to a braking system for use on a light rail vehicle, and more particularly, a mass transit or rapid transit car. Relatively complex braking systems have been used for passenger cars in the past, but the new rapid transit cars are substantially lighter than either standard passenger cars or freight cars. This results in a substantial change in the load to weight ratio of the vehicle. The load to weight ratio for older style passenger cars and freight cars does not change appreciably even when the vehicle is fully loaded. However, light weight rapid transit cars may carry a load which is equal in weight to that of the car body itself. This change in the load to weight ratio, together with the frequent and rapid stops of the rapid transit cars requires a relatively more complex and sophisticated braking system than found in older style rail cars.

OBJECTS OF THE INVENTION

The system of the present invention is particularly intended for use in electrified vehicles wherein both dynamic and friction braking are utilized. The propulsion motor of the vehicle is commonly used as braking means by reversing the traction motor fields and allowing the motor to act as a generator when dynamic braking is required. The present invention is intended to provide a system which will combine the advantages of dynamic braking with the precision of friction braking through a proportional control system.

The wide disparity in weight to load ratios also creates additional problems in friction braking. The amount of force required to effect a given speed reduction for a heavily loaded vehicle will cause the wheels of a lightly loaded vehicle to slide on the rails. This not only reduces the effective braking, but may also create flat spots on the wheel which require repair of replacement of the wheel and a reduction of the in-service time of the car. Accordingly, an object of the invention is to provide a portional braking system that will limit the maximum braking effort of the friction brakes in accordance with the weight of the vehicle. Where rubber tired vehicles are used, as in modern intra-urban transportation systems, the increased coefficient of friction of rubber tires relative to steel wheels reduces the severity of the sliding problem; however, minimization of tire wear is still a desirable object. The present invention is especially suited for use on rubber-tired wheels, but obviously may be used on conventional steel-wheeled types. An object of the invention is to provide a brake system for use with rubber-tired vehicles having axles with both dynamic and friction braking and axles with only friction braking, in which the friction braking on all axles is controlled as a function of the level of dynamic braking on some axles, thereby eliminating the need for separate controllers for axles having friction brakes only.

In recent years, rapid transit or mass transit cars have used air springs or air spring suspension systems rather than coil springs to support the vehicle. The air spring systems provide superior ride characteristics, and will also maintain the height of the car body a fixed distance above the tracks and the loading platform regardless of the load in the cars. The present invention presumes the use of air springs for the proportional braking system.

Another object of the present invention is to provide a combination a parking and fail safe emergency brake for the vehicle. The engineering of this brake presents a variety of problems for the designer. It is perferable to have a quick acting brake control separate from the friction brake control system to provide a redundancy for brake operation. Similarly, it is desired to have a brake control which can be applied without the necessity for external energy from any source other than the operator himself.

Another object of the invention is to provide a brake system for trains having relatively small numbers of cars, such as three sections joined into an articulated unit, in which all electrical and most pneumatic controls may be located in a central section, thereby eliminating the need for parallel controls in each section and reducing the weight and complexity of the system.

SUMMARY OF THE INVENTION

The braking system of the present invention is intended for use on a light rail vehicle of the mass transit or rapid transit variety, particularly those of the rubber-tired vehicle type. The braking system has several individual braking systems which may act independently or redundantly on each axle. The present invention comprises an independant dynamic braking system and an independent, pneumatically controlled, proportional friction brake system. A proportional control means is included for adding the proper amount of friction braking force at all axles to the force established by the dynamic brake system on some axles. The system uses the dynamic brake as a primary brake on motored axles, and applies the same friction braking forces to both motored and non-motored axles, so as to utilize the available adhesion on all wheels during stopping, to provide the shortest stop distance without skidding on sliding wheels. The friction brake is energized at all axles only when the dynamic brake force at motored axles is incapable of producing the selected braking effort, and then only to the extent necessary to satisfy the deficiency.

The invention also includes a combination fail-safe parking brake and emergency system with completely independent means for applying the friction brake. The parking or emergency brake utilizes a pneumatically restrained spring motor which drives a hydraulic motor when the parking or emergency brakes are applied. The brakes may be applied by venting or releasing the pneumatic motor which restrains the spring motor. Local pneumatic reservoirs and appropriate valving are also provided for effecting parking brake release.

In addition to the systems discussed above, there is an additional system capable of independent intervention in the application of the friction brakes. A variable load system regulates the amount of fluid pressure available to the friction brake actuating mechanism. The variable load valve uses the air spring pressure to produce an output pressure of a minimum threshold value, or of a value proportional to the air spring pressure above the threshold. This proportional application of pneumatic pressure causes the application of the friction brake to be a function of the weight of the car.

The invention further comprises a fluid operated friction brake means for the vehicle with an actuating mechanism which is responsive to variations in fluid pressure to actuate the friction brake means. An electrical control means is provided for energizing the dynamic braking means and the fluid operated friction brake means to effect braking of the vehicle. A fluid pressure control valve provides variations in the fluid pressure applied to the friction brake means. The valve includes an electro-pneumatic pressure transducer responsive to variations in current supplied by the electrical control means to vary the fluid pressure supplied to the friction brake means. An object of the present invention is to provide a pneumatic-to-hydraulic converter for the friction brake actuators, comprising first and second pressure responsive pneumatic motors, with the first pneumatic motor responsive to positive fluid pressure variations to actuate a hydraulic piston. A spring motor is also provided and is responsive to reductions in pneumatic pressure supplied to the second pneumatic motor to actuate the hydraulic piston.

DESCRIPTION OF THE PREFERRED EMBODIMENTS

Figure 1:
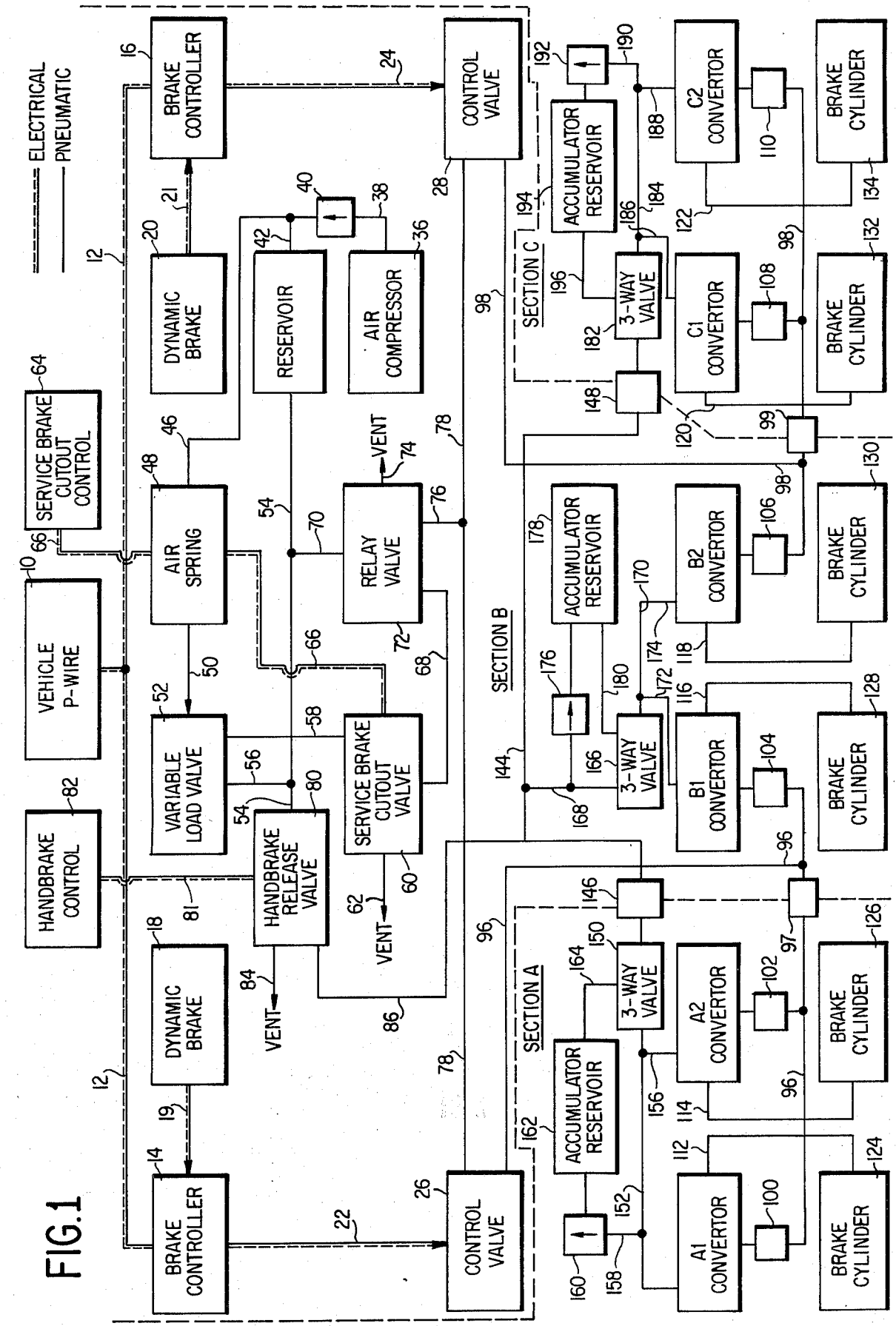
FIG. 1 is a functional block diagram of the interrelationship between the various components of the brake system of the present invention.

There follows a detailed description of the preferred embodiment of the invention, reference being had to the drawings, in which like reference numerals identify like elements of structure in each of the several Figures.

To aid in understanding the present invention, the entire brake control system, and the interaction of the various related components first will be described with respect to functional block diagram FIG. 1; then, each of the various subsystems and components will be described in detail.

FIG. 1 illustrates the interrelationship between the independent braking systems, and the independent intervening system. The independent brake systems include the dynamic braking system, the pneumatically controlled friction brake system, and the independent parking and emergency brake system. The independent intervening system is the variable load system.

As illustrated in FIG. 1, the brake system according to the present invention includes an electrical control system 10, 64 and 82 interconnected with a pneumatic-to-hydraulic brake system via conductor lines 12, 19, 21, 22, 24, 66 and 81. The inventive brake system is intended for use in mass transit or rapid transit cars, and will customarily be applied to trains having only a limited number of cars. This is to be contrasted with conventional brake systems which are intended for use in freight or passenger trains involving 150 to 200 cars.

FIG. 1 illustrates in block diagram form a brake system according to the invention as particularly suited for a three unit, articulated commuter train having three sections identified as sections A, B and C, separated schematically by the dashed lines shown in the Figure. As indicated, substantially all electrical and pneumatic controls are located in center section B. In the light rail vehicle for which the preferred embodiment is intended, a forward brake controller 14 and aft brake controller 16 are electrically connected to a forward dynamic brake unit 18 located in secion A, by conductor line 19 and to an aft dynamic brake unit 20 located in section C by conductor 21, respectively. The trucks in section B have friction brakes only. Each brake controller 14 and 16 receives a signal from the vehicle P wire via conductor line 12 and a signal from the dynamic brake units 18 and 20 via conductor lines 19 and 21. Brake controllers 14 and 16 produce a control signal on lines 22 and 24 which is proportional to the amount of dynamic braking force being generated by dynamic brake units 18 and 20. Conductor lines 22 and 24 are connected to control valves 26 and 28 which produce a pneumatic signal for actuation of the friction brakes, as will be described. The design of the controller and the dynamic brake may take many different forms, and only one form is illustrated in the application. It is understood that the complete dynamic brake also includes a proportion controller (not shown) which is normally mounted in the lead unit of the train to permit the operator to switch the proportion control circuits of the traction motors between motoring and dynamic braking configurations.

The system generates air for the pneumatic control system by means of air compressor 36 which feed reservoir 44 via line 38 and check value 40. Reservoir 44 is sufficiently large to provide 15 full service brake applications and releases with the air compressor 36 completely inoperative. Reservoir 44 supplies the pressure via pneumatic lines 54 for the pneumatic system, which in turn actuates the friction brake system. This reservoir is isolated from compressor 36 and a main reservoir (not shown) by means of check valve 40. Compressor 36 also supplies air pressure to all auxiliaries and, via line 46, to the air spring 48 located between the car truck and the car body. Check valve 40 and relay valve 72 isolate the pneumatic control system for the auxiliaries and the air spring system so as to prevent the loss of control pressure in the event of a rupture in air spring 48, or a malfunction of any of the auxiliary systems' components.

In normal operation, the variable load system regulates the amount of pressure available to control valves 26 and 28. This is necessary since during a full brake application, that is, either a full service or emergency application, a predetermined amount of braking force is applied to the wheels of the vehicle through the friction braking system to bring the vehicle to a stop as quickly and as safety as possible. Since the braking force required during a full brake application is proportional to the total weight of the car, including its load, it is necessary to provide means for measuring the load and regulating the brake cylinder pressure during a full service application. If this were not done, the full braking force required for a fully loaded car would cause the wheels of an empty car to slide, or conversely the full braking force required for an empty car would be insufficient to quickly and safely stop a fully loaded car.

The car body is normally isolated from the trucks by means of air spring 48, which serves several functions. The air spring mechanism will maintain the height of the car body a fixed distance above the tracks and the loading platform regardless of the load in the car. This is accomplished by varying the pressure of the air spring mechanism in accordance with the change in the load carried by the car body. The variable air pressure present in the air spring 48 may then be used to provide a proportional indication of the load carried by the vehicle itself. This variable pressure is applied via pneumatic line 50 to variable control valve 52, which will vary the amount of pressure supplied to control valves 26 and 28.

Variable load control valve 52 receives inputs from air spring 48 and, via line 54, reservoir 44 and produces an output on pneumatic line 56. Valve 52 has a minimum threshold output equal to the brake cylinder pressure required to provide a full brake on an empty car. This value of pressure is supplied to control valves 26 and 28 in the absence of air spring pressure on line 50 or any time that air spring pressure is below a value corresponding to the empty car condition. When the air spring pressure is at a value above the minimum required for an empty car, the output of variable load control valve 52 will rise above the threshold by an amount proportional to the rise of air spring pressure above that required for an empty car.

Relay valve 72 isolates reservoir 44 from control valves 26 and 28. This valve provides a 1:1 repetition of the pressure received via pneumatic line 58 and 68 from variable load valve 52. It is required because control valves 26 and 28 may demand a greater volumetric flow of air than could be supplied directly by the variable control valve 52. The output of relay valve 72 is delivered via lines 76 and 78 to control valves 26 and 28.

The brake system of the present invention also provides a fail-safe parking and emergency brake system which is energized through a separate control system. This is accomplished by a second fluid motor means in each of the pneumatic to hydraulic converters A1, A2, B1, B2, C1 and C2 which restrain spring motor means for actuating the hydraulic portion of the hydraulic converters. This second fluid means is normally energized and connected to a hand brake release valve 80 by means of hand brake piping 86, 144, 152 and 184. When it is desired to apply the parking or emergency brake, the hand brake release valve 55 is energized by control 82 via control conductor 81, thereby venting the pressure in line 86 to atmosphere. This allows the spring motor means in the pneumatic to hydraulic converters to energize the hydraulic motor and brake cylinders 124 to 134. This application is accomplished through control line 81; however, manual release valves may also be provided. This feature also provides a potential "last ditch" braking capability. The parking brake may also be manually released with a wrench at each of the converters.

The system also includes a service brake cut out valve 60 for completely de-energizing the friction brake system in response to a control signal on line 66 from controller 64. Cut out valve 60 is used for towing and/or completing the mission in the event of malfunction of one of the braking systems. Manual cut out valves may also be provided at each truck on a per truck basis.

As shown in FIG. 1, control valves 26 and 28 receive a pneumatic signal from relay valve 72, which is directly proportional to the load carried by the rail cars; and an electrical signal from brake controllers 14 and 16, which is proportional to the amount of dynamic braking being applied by dynamic brakes 18 and 20. Control valves 26 and 28 produce an application pressure for the friction brakes on pneumatic lines 96 and 98, which are connected to pneumatic-to-hydraulic converters A1, A2 and B1, for control valve 26; and to pneumatic-to-hydraulic converters B2, C1 and C2, for control valve 28. Interposed between control valves 26 and 28 and their respective converters are cut-out valves 100, 102, 104, 106 108 and 110, which may be locally actuated to disable an individual converter as necessary for repair, maintenance and the like. Output pneumatic lines 112, 114, 116, 118, 120 and 122 connect the pneumatic-to-hydraulic converters to brake cylinders 124, 126, 128, 130, 132 and 134 as indicated. Thus, the application of pressure via control valves 26 and 28 to the individual converters produces a hydraulic brake actuating pressure which is than applied to the brake cylinders at each individual truck. It should be noted that connectors 97 and 99 join pneumatic lines 96 and 98, respectively, at the points where they traverse the articulated joints between sections A and B, and B and C. In order to reduce the length of pneumatic piping between each control valve and its respective convertors, convertors A1 and A2 are placed as close to connector 97 as practical in section A and convertor B1 is similarly placed in section B. Likewise the section of line 96 leading from control valve 26 is made as short as practical by placing valve 26 close to connector 97 and convertor B1. Similar arrangements are made for control valve 28, convertors B2, C1 and C2 and connector 99. These shortened pneumatic lines reduce the time required for brake pressure builders in lines 96 and 98, and thus yield faster brake applications. The length of hydraulic lines 112 to 122 is not so important since negligible time delays are encountered in pressurizing the hydraulic side of the system.

As previously mentioned, each of the pneumatic-to-hydraulic converters includes a pneumatically restrained spring motor section which is used for parking and emergency applications of the brakes. The pneumatic pressure for restraining the spring motor portions is delivered from reservoir 44 via pneumatic line 54, hand brake release valve 80, pneumatic line 86 and pneumatic line 144 to each section of the rail car. At the locations where line 144 passes from section B to section A and from section B to section C, are located connectors 146 and 148, which do not reseal should section A, B and C become separated during use. In section A, three way valve 150, pneumatic line 152 and pneumatic lines 154 and 156 are connected to the pneumatic motors for restraining the spring brakes in converters A1 and A2. Line 158 and check valve 160 connect line 152 to accumulator reservoir 162 which is also connected via line 164 to three way valve 150. As will be subsequently discussed, the provision of accumulator reservoir 162 makes possible the local release of the spring applied hand brake in the event that one section of the car should become separated from another, causing depressurization of line 144 and resultant application of the spring applied brakes. In sections B and C, three way valves 166 and 182, pneumatic lines 170, 172, 174 and pneumatic lines 184, 186 and 188 direct pneumatic pressure to the fluid motors for restraining the spring brake portions of converters B1, B2, C1 and C2. Similarly, check valves 176 and 192, accumulator reservoirs 178 and 194 and lines 180 and 196 provide local hand brake release capability for each of the other car sections. As will be discussed later, the unique interconnection of the accumulator reservoirs and three way valves provides the capability of selectively releasing the spring applied brakes in the car section in which an individual three way valve is located or in adjacent car sections. To facilitate speedy pressurization and release of the spring brakes, pneumatic lines 86, 144, 170 and 184 are designed to be as short as practical, in a manner analogous to that for the control valve lines, as discussed above.

The individual subsystems of the brake system according to the present invention will now be discussed in detail.

THE VARIABLE LOAD SYSTEM

Figure 2:
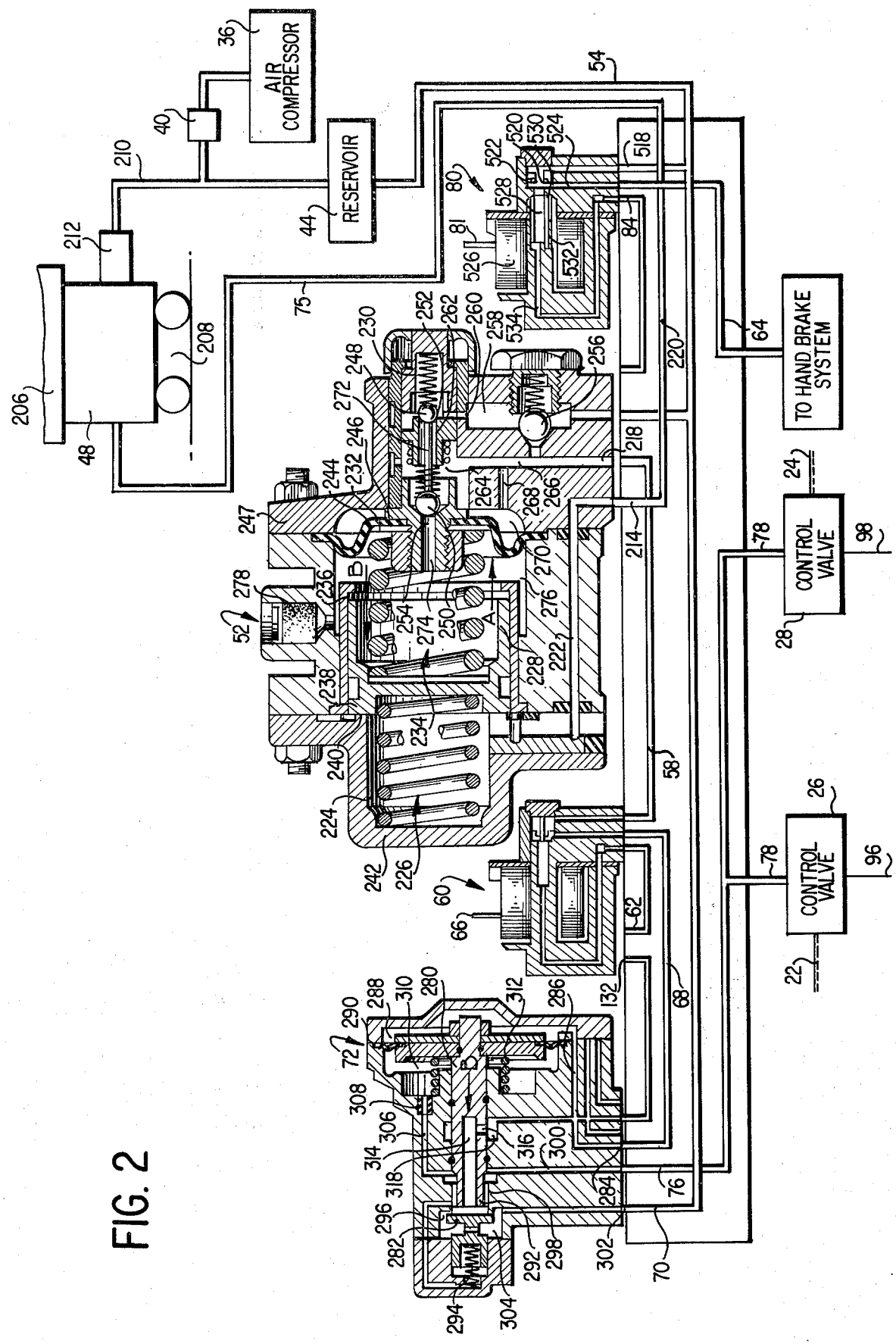
FIG. 2 is a cross sectional and schematic view of the air pressure control manifold.

The variable load system and its associated manifold are illustrated diagrammatically and in cross section in FIG. 2. The components of the variable load system are fully described in my U.S. Pat. No. 3,730,597 entitled "Variable Load Brake Control Apparatus" filed July 16, 1971, the contents of which are incorporated herein by reference. The variable load system is regulated by an air spring mechanism which supports the car body 206 on its truck 208. The air spring mechanism 48 is intended to maintain the height of the car body at a fixed distance above the platform or rails to assist passengers in boarding or alighting from the vehicle. As the load of the vehicle increases, the air pressure in the air spring must be increased if the constant height is to be maintained. This increase in air pressure is provided by pneumatic line 210 and regulator 212. As the load of the vehicle goes up, the air pressure in the air spring must also go up to maintain the car body at a constant height. The variance in air pressure in air spring 48 between an empty load and full load is used to regulate the variable control valve 52. There is one significant problem which arises in attempting to adapt the air spring device for the new rapid transit or mass transit cars. Since these cars are relatively light weight in construction, and carry relatively high loads, their load ratios cover a substantial range.

The air spring mechanism 48 is usually in the form of one or more flexible bags located between the car body and the trucks. The regulating valve mechanism 212 is actuated in response to vertical movements of the car body caused by variations in the load of the car body to selectively increase or decrease the pressure in air spring 48. Thus, if the load on the car body increases, the car body moves downwardly towards the trucks and actuates regulating valve mechanism 212 to increase the pressure in air spring 48. This increase in pressure then lifts the car body back to its original predetermined height above the platform or rails. Conversely, if the load on the car decreases, the car body rises with respect to the trucks and actuates regulating valve mechanism 212 to decrease the pressure in the air spring 48 which in turn lowers the car back to its original predetermined height.

The variations in pressure present in air spring 48 are used to regulate the variable load control valve 52 illustrated in FIG. 2. As illustrated in FIG. 2, incoming air from the main reservoir passes through check valve 40, and enters reservoir 44 and regulator 212. Air pressure form reservoir 44 passes through pneumatic line 54 to the hand brake release valve 80, variable load valve 52, and relay valve 72. The variable load system provides air to the control valves 26 and 28 from reservoir 44 through relay valve 72. The incoming air pressure present on manifold line 54 passes through the relay portion of relay valve 72 and exits into pneumatic line 76. The purpose of the variable load valve and the relay valve is to regulate the pressure of the air present in line 76 and to provide an increase in the available volumetric flow of air to the control valves 26 and 28 over that which would be available if only the variable load valve alone was used to supply these valves.

The variable load valve receives a pilot pressure from the air spring via conduit 50, which enters the manifold and is conveyed to inlet port 214. Simultaneously, operating pressure from the supply reservoir 44 is supplied to the relay portion of variable load valve 52 through entry port 216, and is conveyed to the control portion of relay valve 72 via exhaust port 218, line 58, cutout valve 60, and line 68.

Variable load valve 52 is illustrated in an "empty" configuration. That is, the minimum amout of pressure is presented to the pilot portion of valve 52 via air spring 48. This minimum air pressure is conveyed to the variable load valve through conduit 50, pneumatic line 220, inlet port 214, and passageway 222, to the pilot chamber 224. This pilot pressure together with spring 226 exerts a force acting in the direction of arrow A on the left side of piston 228. Balancing this force is a force acting on the right side of piston 228 exerted by spring 230 through retainer plate 232 and spring 234. Since the opposing forces of spring 234 are balanced, the piston is at rest at a predetermined location within the guide bore 236.

When the car is empty, the pilot pressure in chamber 224 is at its minimum, and the piston 228 will rest with its shoulder portion 238 in immediate abutment with the shoulder 240 of cap member 242. If the pressure in chamber 224 were at its maximum as in a fully loaded condition, piston 228 would be driven in the direction of arrow A to cause retainer plate 232 and control diaphragm 244 to abut the shoulder 246 of upper cap 247.

The relay portion of the variable load valve comprises supply valve 248, exhaust valve 250 and their associated valve seats 252 and 254. As illustrated in FIG. 2, supply valve 248 is open and air pressure entering inlet port 216 passes upwardly through check valve 256 and into chamber 258. From chamber 258 it enters the relay valve through port 260 and passes between the supply valve 248 and its seat 252 to coaxial bore 262. From bore 262, it enters chamber 264 and exits through exhaust passage 266 and exhaust port 218. Air pressure in exhaust passage 266 will simultaneously traverse through interior passage 268 to the control chamber 270 immediately adjacent diaphragm 244.

The inlet and exhaust valves 248 and 250 are linked together by means of pin 272. As illustrated in FIG. 2, exhaust valve 250 is firmly seated against exhaust seat 254 by means of spring 230. At the same time, the interconnecting pin 272 has lifted input valve 248 from valve seat 252 to open the relay portion of the valve.

As the air pressure from supply reservoir 44 passes through the relay valve portion of variable load valve 52 it pressurizes chamber 270 until the pressure therein is sufficient to compress spring 234 and move diaphragm 244 and retainer plate 232 to the left as indicated by arrow B. As retainer plate 232 is moved to the left, exhaust valve 250 is driven to the left by pin 272, supply valve 248 and spring 230. When the pressure in chamber 270 has reached a predetermined level, supply valve 248 will seat against 252 and close coaxial bore passage 262. The amount of air pressure now present in exhaust port 218, line 58 and line 68 will be reproduced by the relay valve 72 in line 78, as will be hereinafter explained.

As the vehicle is loaded, the air pressure present in air spring 48 will increase, an consequently the air pressure present in conduit 50, inlet port 214, passage 222, and pilot chamber 224 will also increase. As this pressure increases, the pressure on piston 228 and the force of spring 226 will combine to move piston 228 to the right in the direction of arrow A. As piston 228 moves in the direction of arrow A, it will move spring means 234 and retainer plate 232 to the right. Retainer plate 234 will then unseat supply valve 248, allowing additional pressure to be transmitted to relay valve 72 and control chamber 270. Eventually, as piston 228 is moved to the right, the retainer plate 234 will move into abutment with shoulder 246 of end cap 247. Any subsequent increases in pressure will only result in a further compression of spring 234. It should be noted that at this point, the pressure required in chamber 270 to move the diaphragm 244 and retainer plate 234 to the left as indicated by the arrow B will be substantially greater than it was for the empty car. The pressure in chamber 270 must rise to a force sufficient to overcome combined forces of spring 234 and/or spring 226 and the pressure in chamber 224 to reseat the supply valve 248. When such equilibrium is reached, the supply valve 242 will again close, shutting off bore 262.

It should be noted that the spring constants of springs 226 and 234 are very important. As discussed previously the pressure in air spring 48 varies according to a first relationship determined by the ratio of the load to the weight of the car body only, and not the rail vehicle itself. The pressure delivered to the relay valve 72 varies, however, according to a second and different relationship determined by the ratio of the load to the total weight of the vehicle. Accordingly, full braking pressure need not vary as greatly as the air spring pressure. In the preferred embodiment of the invention, the effective area of piston 228 and diaphragm 244 are substantially equal. The spring constant of spring 234, however, is larger than that of spring 226 by an amount which causes the full service brake pressure to vary in accordance with the second relationship, even though the air spring pressure varies according to the first relationship.

It should be pointed out that the pressure in air spring 48 will increase and decrease incrementally at each stop as passengers enter and leave the vehicle. If the load in car 206 is increased, regulating valve 212 will provide additional air pressure to air spring 48 to bring the body to a predetermined distance above the tracks or station platform. When this additional pressure is imposed within air spring 48, it is transmitted through pipe 50, inlet port 214, and passage 222, to pilot chamber 224. This increase in air pressure will cause an additional movement of piston 228 to the right as indicated by the arrow A. This movement will also cause a movement of retainer plate 232 to the right which will lift supply valve 248 from its seat 252. At this point, additional air pressure will flow from the inlet passage 216 through the coaxial bore 262 and back out the outlet passage 218. Simultaneously, the air will flow through passage 268 to control chamber 270 until the pressure in control chamber 270 is sufficient to move the retainer plate 232 in the direction indicated by arrow B to again reseat valve 248.

If the load of the vehicle is decreased, regulating means 212 will exhaust air from the air spring means 48. When pressure is reduced in the air spring 48, it is correspondingly reduced in pipe 50, inlet passage 214, and pilot chamber 224. As the pressure is reduced, the piston means 228 will move to the left as indicated by the arrow B and the control pressure already present in control chamber 270 will move the diaphragm 244 in retainer plate 232 to the left as indicated in the arrow B. Since exhaust valve 250 is restrained in a fixed position by means of linking pin 272, and the seating of valve 242 upon valve seat 252, exhaust valve 250 will be upseated from its valve seat 254, and the excess pressure in control chamber 270 will be allowed to flow through the axial bore 274 into chamber 276 and out exhaust passage 278. This also serves to reduce the pressure in passageway 268, exhaust passage 218, lines 58 and 68 and relay valve 72. When the control chamber 270 has been sufficiently vented, the spring 234 will overcome the pressure in chamber 270 and will again move retainer plate 232 to the right as indicated by the arrow A, and cause valve seat 254 to engage exhaust valve 250. As can be seen from the foregoing description, variable load valve 52 produces a variable pressure that is partially proportional to the pressure present in air spring 48, and the load carried by the vehicle. The difference in spring constants between spring 226 and spring 234 is provided to account for the difference in load-to-weight ratios between the load and the weight of the vehicle. These pressures are reproduced in the friction brake control system by relay valve 72 in the following manner.

Relay valve 72 is a high capacity diaphragm operated self-lapping relay valve having an O-ring piston 280 and a double seated rubber check valve disc 282. Its function is to supply and exhaust the control air pressure for the friction brake system during brake applications and releases. The relay valve is intended to provide the control valves with a pressure approximately equal to that developed by the variable load valve 52 in line 68 and input port 284. As pressure rises at input port 284, it is conveyed through interior passageway 286 to the pilot chamber 288 on the right side of diaphragm 290. The air pressure developed in chamber 288 causes diaphragm 290 and piston 280 to move to the left as indicated by the arrow B until the end of the piston stem 292 contacts and then seals against the underside of the rubber check valve disc 282.

Spring member 294 normally urges check valve 282 to a closed position against seat 296. Further pressure in chamber 288, will cause further movement in piston 280, which will cause the rubber check valve 282 to be lifted off seat 296, opening a connection between supply reservoir line 54, coaxial passage 298 between the piston and the body of valve 72 to the output passage 300 and output lines 78. This air pressure is also conveyed by means of inner passageway 306 through choke 308 to spring chamber 310 on the other side of diaphragm 290. The purpose of choke 308 is to damp out any pressure waves which might cause transient unseating of piston 280 and valve 282. As the pressure builds in chamber 310, it begins to equalize the pressure present in chamber 288. When the equalization is reached, spring means 312 will move piston 280 to the right, causing valve disc 282 to lap on valve seat 296, thereby shutting off any further passage of air between inlet line 70 and output lines 78.

The relay valve functions to maintain a constant pressure in delivery lines 78. If brake cylinder or systems leakage should cause the pressure to decrease, the pressure in spring chamber 310 will also decrease, and the pressure maintained in pilot chamber 288 will cause movement of the piston 280 in the direction of arrow B. This will cause a second unseating of valve disc 282, and a second charge of air will be transmitted from input line 70 to delivery lines 78. When equalization with the control pressure in chamber 288 is again reached, the piston and diaphragm assembly will again be moved to the lap position cutting off further flow of air from the supply reservoir to the delivery lines 78.

In the event of a malfunction of the friction brake system, it may be desirable to disengage the entire friction brake system to enable the vehicle to be towed, or to enable one car of the train to complete its mission, until repairs can be made. The friction brake system may be completely cut out by actuating service brake cut out valve 60. Valve 60 normally provides a through passage between line 58 and line 68. When it is energized, it exhausts line 68 through valve 60 to exhaust passageway 62. When the air in line 68 is exhausted, the pressure present in pilot chamber 288 will also be exhausted. As this occurs, spring means 312 will move diaphragm 290 to the right. This movement seats valve disc 282 on seat 296 and unseats the disc from the exhaust seat 292 of piston 290. When the exhaust valve is unseated, manifold pressure in lines 78 is then free to flow from the lines 78 through axial bore 314, radial port 316, chamber 318 and out through exhaust line 74. Thus the actuation of cutout valve 60 will effectively exhaust all air pressure present in the lines 78.

PROPORTIONAL CONTROL SYSTEM

The proportional control system of the present invention has two independent subsystems. The first employs a proportional control valve to mix the friction braking with the dynamic braking for car sections A and C. The first subsystem also applied the same friction braking force to section B as the friction forces in sections A and B, even though no dynamic braking is present in section B. The other proportional system includes the air springs and variable load valve previously discussed.

In operation, the vehicle P wire control 10 supplies a variable signal from 0 to 10 volts to the brake command control centers 14 and 16. The centers adjust a number of factors including the total vehicle load weight, the jerk limit for the train, and the amount of dynamic brake feed-back received form the dynamic brake means. The control center then supplies a graduated signal to the proportional control valves 26 and 28. An amplifier may be used to boost the incoming control signal to a 0 to 20 volt range for use by the proportional control valves. The proportional control valves receive a predetermined input pressure from line 78 of appropriately 100 psi. The proportional control valves produce an output pressure which increases as the voltage from the brake control centers decreases from the prescribed level. This proportional control valve uses many of the components described and illustrated in my U.S. Pat. Nos. 3,528,709, Electric Current to Pneumatic Pressure Transducer, 3,536,360 and 3,535,351 entitled "Blending Scheme for Current Responsive Railway Brake", the disclosures of which are incorporated herein by reference.

In this system application, the blending of dynamic brake effort and friction brake effort takes place in the brake command control centers 14 and 16, rather than in the control valves 26 and 28. Control valves 26 and 28 supply a regulated pneumatic output to conduits 96 and 98 which varies inversely with the amount of dynamic braking effected by dynamic braking means 18 and 20. The proportional control valve 26 supplies the pneumatic control pressure to the two trucks in section A of the vehicle and one truck in section B, via line 96. Control valve 28 supplies the remaining trucks via line 98.

The incoming pressure to control valves 26 and 28 therefore established as previously discussed at approximately 100 pounds per square inch. Valves 26 and 28 are essentially the same, an in FIG. 2, one of the valves has been illustrated in block form, while the other is illustrated in cross section.

Each of the blending control valve means employed in this system includes 4 main components. The first component is an electrical torque motor 336. Motor 336 responds to electrical signal variations in control line 22. The torque motor exerts a proprotional torque on comparator shaft 338. The second component is a pneumatic torque motor 340 which applies to shaft 338 a resisting torque which decreases linearly with increases in the pressure applied to the friction brake system through output line 342. The third component comprises a pilot valve assembly or pressure transducer 344 which is driven by shaft 338. It serves to control the pilot pressure in a pair of pilot passages 346 and 348. The fourth component comprises the supply and exhaust valve assembly 350 which serves to regulate the input pressure from line 78 to the friction brake system in accordance with the pilot pressures produced in lines 346 and 348.

The electrical torque motor 336 is of known design and comprises a permanent magnet rotor which rotates within a wound stator. The direction in which the motor rotates depends upon the direction of current flow through the stator, and the motor circuits are so correlated that it always rotate in the same direction. The torque output of the motor is directly proportional to the magnitude of the current and the sine of the magnetic angle between adjacent unlike poles of the rotor and stator.

The output of the torque motor is connected directly to pneumatic torque motor 340. The operation of this torque motor is fully explained in my previous U.S. Pat. No. 3,536,361, the disclosure of which is incorporated herein by reference. This torque motor provides a counter-vailing or balancing torque on shaft 338. When the pressure in output line 342 is at zero, pneumatic torque motor 340 is applying a spring loaded maximum torque output to shaft 338. Conversely, when a full service application is made, torque motor 340 applies a minimum torque. The force exerted on shaft 338 varies inversely with pressure, and is a negative function of transducer output pressure.

Pneumatic transducer 344 uses the combined output on shaft 338 to vary the pilot pressure supplied to the main supply and exhaust valve 350. The pneumatic transducer receives incoming pilot pressure from line 348. The pneumatic transducer responds to torque input on shaft 338 to provide three output conditions:

a. In the normal or application position, the transducer vents pilot pressure from the pilot passages 346 and 348.
b. At the extreme limit of angular rotation of shaft 338, pilot pressure is supplied to passages 346 and 348 and the transducer is in its released position.
c. In an intermediate position between a and b above, pilot passage 346 is pressurized and pilot passage 348 is vented. Any angular rotation out of this intermediate position, in the direction toward the limit of travel, will establish pressure in pilot passage 352, and operate the release valve to decrease pressure output. Rotation in the opposite sense, that is, toward the normal position will cause both pilot lines to be vented.

The main supply and exhaust valve 350 includes poppet type supply and exhaust valves 354 and 356 arranged to control flow from the main inlet input manifold 78 to the main brake control line 96 or to exhaust port 358 and the surrounding atmosphere. Supply and exhaust valves 354 and 356 are carried by spool portions 360 and 362 which reciprocate in axially aligned bores and are arranged so that if either valve (354 or 356) moves in either direction, it engages the other, and causes it to move in a valve closing direction. The opposite ends of each spool have equal cross sectional balancing areas and are interconnected by passages extending through the spools. This renders both valve insensitive to changes in transducer outlet pressures. The supply and exhaust valves 354 and 356 may be shifted in its respective opening direction by first and second pilot motor means comprising compression spring 366 and diaphragm 368 (for valve 354) or by compression spring 370 and diaphragm means 372 (for valve 356). It should be noted that the corresponding parts of the two pilot motor means are reversed so that in one case the valve (354) is opened by the diaphragm motor. The arrangement of the parts is such that:

a. Spring 366 opens supply valve 354 and holds exhaust valve 356 closed when the pilot passages 346 and 348 and diaphragm motor chambers 374 and 376 are vented.
b. Diaphragm motor means 372 will open exhaust valve 356 and hold supply valve 354 closed when both diaphragm motors are pressurized.
c. Spring means 364 will close both the supply and exhaust valves when diaphragm motor chamber 374 is pressurized and diaphragm motor chamber 376 is vented.

These three conditions of the supply and exhaust valve 350 correspond directly to the three positions of the pneumatic transducer 344 referred to above.

Application of the dynamic brake and the friction brake may be accomplished through the brake command centers 14 and 16.

In the preferred embodiment of the invention, control circuitry 10 carries a constant voltage of 10 volts. A reduction in the voltage carried on control line 10 will effect a brake application. The 0–10 volt signal on line 10 is amplified to a 0–20 volt signal by amplifiers (not shown). The application is proportional to the reduction in voltage below the 10 volt standard. For example, if the control circuitry voltage was zero, a full brake application would result. On the other hand, a five volt reduction would produce a proportionally smaller brake application. In the embodiment that is illustrated in FIGS. 1 and 2, the friction brakes for the all trucks are controlled by proportioning valves 26 and 28, which serve to adjust the effective braking force of the friction brakes to that of the dynamic brakes. The control sequence operates essentially in an additive manner from the control system signal present on line 10. Thus, if the control system voltage were reduced to zero, but the dynamic braking means indicated a 10 bolt output from the dynamic brakes 18 and 20, the command centers 14 and 16 would not call for friction brake application. On the other hand, if in the above example the dynamic brake voltage output was only 8 volts, the net voltage reduction of 2 volts would produce a call for a friction brake application of approximately 20%. This would be the amount required to produce a fully effective blended service brake application.

It should be noted that in trains having more than the illustrated three sections, control line 10 may be interconnected to the additional sections of the train to effect uniform reduction and uniform braking for each of them. This may be accomplished in any one of several ways. A single control line may extend throughout the train, and supply the operating control signal for each brake system for each group of sections. In this situation, it may be desirable to utilize D C amplifiers for each control valve which in turn supply the operating voltage for torque motors 336.

Figure 3:
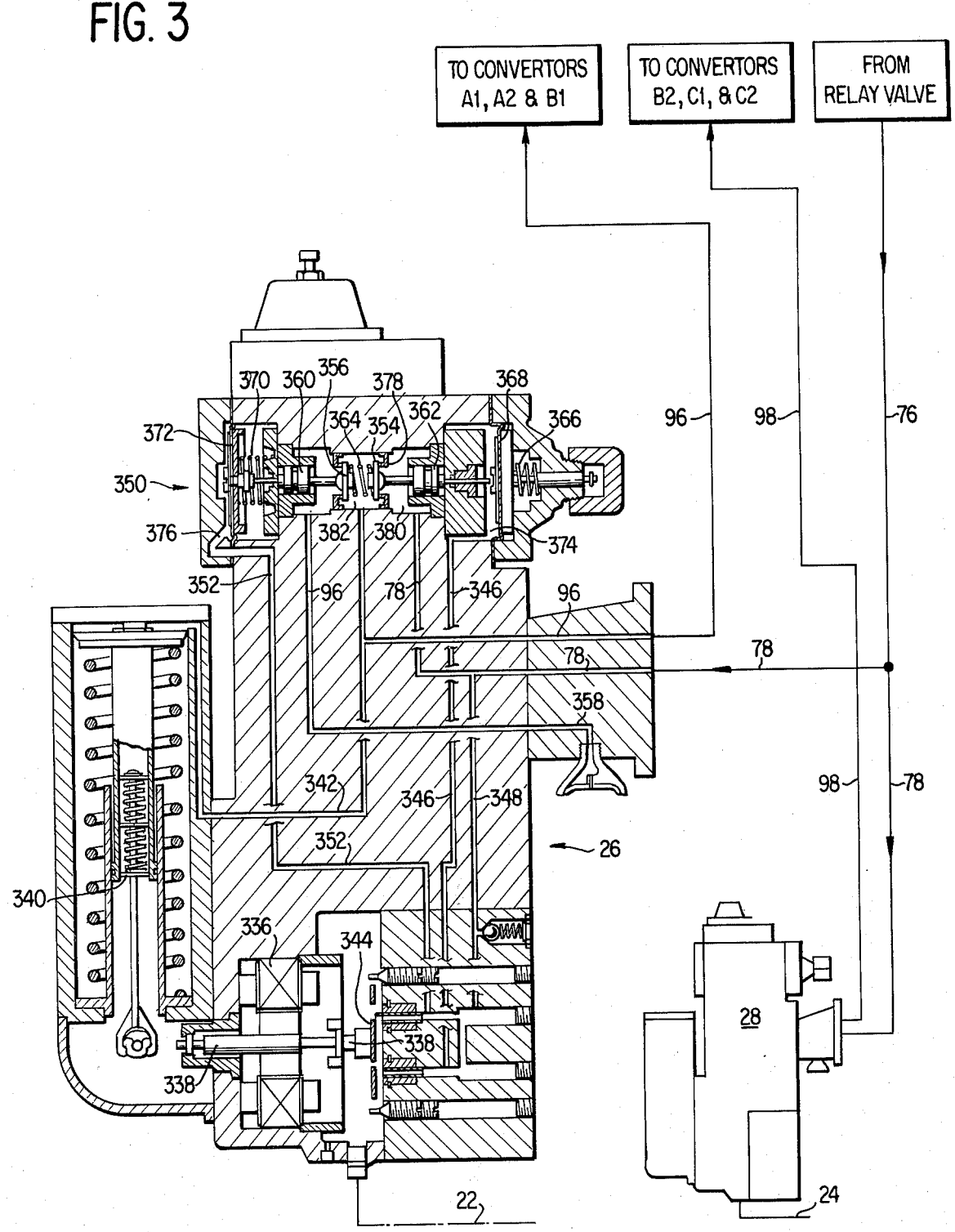
FIG. 3 is a control sectional view of the control valve.

When the brake system of FIG. 3 is in use, and the propulsion controller is set in a motoring position, the circuits of the dynamic brakes 18 and 20 will be in the motoring configuration and the voltage form the control centers 14 and 16 will be at its maximum. The torque output of motor 336 will also be at its maximum and will maintain the comparator shaft 338 in a release position for transducer 344. All of the components of the supply and exhaust valve 350 will assume their illustrated positions and the brake cylinder line 96 will be vented to atmosphere through port 358.

In order to apply the brakes, the operator shifts the propulsion controller to a coast position, thereby reducing the voltage in control line 10, and switching the circuits of the brakes 18 and 20 to a braking configuration to establish a dynamic braking effort. Since the traction motors now act as generators, they supply voltage to brake command centers 14 and 16. If the dynamic brake itself can satisfy the braking command, the signal output from the command centers 14 and 16 will remain constant, and the comparator shaft 338 will remain in the extreme release position. In this case, the pneumatic transducer 344 will remain in a release position with pilot lines 346 and 348 pressurized and brake cylinder line 96 vented. If on the other hand, the dynamic brake is incapable of supplying the braking effort called for by control centers 14 and 16, the reduction in the torque output of motor 336, and the pneumatic torque motor 340 will rotate comparative shaft 338 towards the apply position. As shaft 338 rotates towards the apply position, pneumatic transducer 344 will vent the pressure present in pilot lines 346 and 348, and consequently the fluid pressure present in chambers 374 and 376. When this pressure is vented, spring means 366 will open valve 354, and simultaneously close exhaust valve 356. When valve 354 is moved from seat 378 it opens communication between inlet chamber 380, and outlet chamber 382, establishing communication between input manifold line 78 and brake line 96. Since the exhaust valve 356 has been closed, air pressure will now be supplied to the friction braking means through brake line 96. As the pressure in line 96 develops, the torque output of pneumatic torque motor 366 will be reduced, and the torque which it applies to comparator shaft 338 will be reduced. Accordingly, as the braking effort of the friction brake means approaches the level required to compensate for the deficiency in the output of the dynamic brake means, the electrical torque motors 336 will begin to rotate comparator shaft 338 towards the intermediate or lap position. When the sum of the outputs of the friction and dynamic braking means is equal to the selected braking effort, the torques exerted on shaft 338 will be balanced, and pressure transducer 344 will rest in an intermediate or lap position.

In the lap position, pilot passage 346 is pressurized while pilot passage 348 is vented. As the pneumatic transducer. moves to its lap position, the working pressure in chamber 374 will increase, and the diaphragm motor means 368 will over power spring 366 allowing spring means 364 to close the supply valve 354.

After train speed has been reduced to a low level, the braking effort on the dynamic brake means will begin to "fade". This will reduce the amount of voltage supplied to the command centers 14 and 16. When the train enters this portion of the braking cycle, the torque acting on comparator shaft 338 will again become unbalanced in the opposite direction and pneumatic torque motor 340 will shift the pressure transducer to an application position. This position will vent both of the working spaces 374 and 376 through pilot control lines 346 and 348 and allow spring means 366 to open supply valve 354 and close exhaust valve 356. Air under pressure will now be supplied through inlet chamber 380 and exhaust port 382 to brake line 96. As the pressure rises in brake line 96, the increased pressure will effect a reduction in the torque output of pneumatic torque motor 340. When the braking effort of the pneumatically operated friction brake is increased sufficiently to offset the decrease in the output of the dynamic brake due to fade the torque motors 336 and 340 will return the pneumatic transducer to a lap position.

In view of the foregoing discussion, it should be evident that, regardless of the effect of speed on dynamic braking effort, the system will always graduate the friction braking effort as needed to maintain the total braking effort required.

Pneumatic-to-Hydraulic Converter

Figure 4:
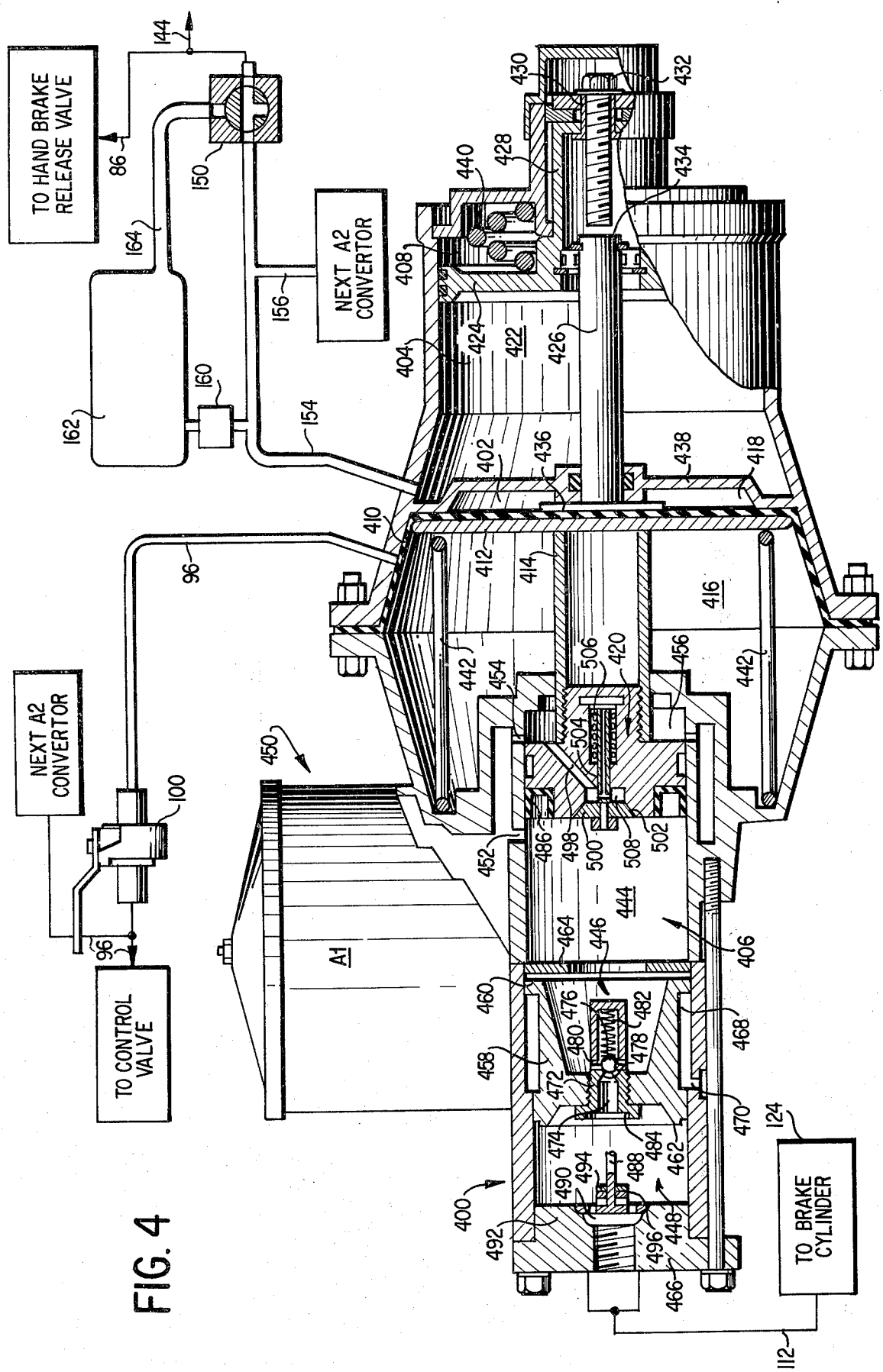
FIG. 4 is a cross sectional view of the pneumatic to hydraulic converter, showing the parking and emergency brake application and release system.

FIG. 4 is a cross sectioned and diagrammatical representation of the friction brake subsystem of the present invention, showing the interconnection with the control valves and hand brake system. This subsystem comprise a pneumatic-to-hydraulic converter generally designated as A1, the pneumatic control input line 96, hand brake control line 154, a hydraulic slack adjuster 400, a hydraulic brake line 112, and brake cylinder 124. The pneumatic-to-hyraulic converter has first and second fluid motors 402 and 404 and a hydraulic motor 406. The converter also employs a spring motor 408 which is restrained by the action of the second fluid motor 404. The converter is responsive to positive variations in pressure to actuate the first fluid motor 402. The spring motor 408 is responsive to reductions in fluid pressure in the second fluid motor 404 to actuate the hydraulic motor 406.

The first fluid motor 402 comprises flexible diaphragm 410, piston 412, push rod 414 and chambers 416 and 418. As chamber 418 is pressurized, the flexible diaphragm 410 exerts pressure on piston 412 forcing the push rod 414 and hydraulic piston 420 to the left. The second fluid motor comprises chamber 422, piston 424 and a second push rod 426. Piston means 424 is slidably mounted on push rod 426. The rear portion 428 of piston 424 has fitted therein a threaded collar 430 and an adjustable bolt means 432. The adjustable bolt 432 bears against push rod 426 as indicated at 434 to couple piston 424 to push rod 426. Push rod 426 is in turn coupled to piston 412 and diaphragm 410 by means of pressure plate 436. Push rod 426 extends through the intermediate wall 438 which divides the converter into first and second fluid motor portions. Spring motor means 408 exerts a constant bias on piston 424 via spring 440, urging it to the left as illustrated in FIG. 4. The air pressure present in chamber 422 acts as a restrainer to prevent the pressure exerted on piston 165 by spring 440 from being applied to push rod 426. A hand brake actuation is accomplished by venting or releasing the pressure in chamber 422 which in turn allows spring 440 to energize hydraulic piston 420 through piston 424, bearing plate 436, and push rod 414. The hand brake may be manually released by turning bolt 432 with a wrench as will be hereinafter explained.

Release of the first motor means 402 is accomplished by venting the brake cylinder pipe 96 through the service brake cut out valve 60 illustrated in FIG. 2. As chamber 418 is vented, spring means 442 will exert a force to the right on piston 412 to return it to the position illustrated in FIG. 4. If the spring motor means 408 has been actuated by venting the pressure in chamber 422, it is necessary either to manually release spring motor 408 or to restore the fluid pressure in chamber 422 before the brakes can be released.

The hydraulic motor 406 and slack adjuster 400 comprise three axially aligned stepped bores 444, 446 and 448. The structure and operation of slack adjuster 400 is more fully illustrated and described in my copending U.S. application Ser. No. 302,415 entitled "Hydraulic Slack Adjuster and Brake Circuits Therefor", the disclosure of which is incorporated herein by reference. Hydraulic fluid for the hydraulic motor is stored in reservoir 450, and enters the first hydraulic chamber 444 through port 452. In addition, there is a second port 454 which is provided to permit free flow of hydraulic oil into chamber 456 when the brake is applied, and permit the free return of this oil to the sump when the brakes are released. The operation of this transfer will be later explained. In operation, hydraulic fluid completely fills the chambers 444, 446 and 448, together with the hydraulic pressure line 112 and the brake cylinder 124. An application of the hydraulic pressure is made by pressurizing chamber 418 of fluid motor means 402. As piston 412 and push rod 414 are driven to the left, piston 420 is moved through its discharge stroke, to displace oil from space 444 into the slack adjuster 400. The maximum output pressure to the brake cylinders equals the product of the pneumatic pressure supplied to motor 402 and the ratio of the effective area of diagphragm 410 to the effective area of hydraulic piston 420.

The hydraulic slack adjuster comprises a stepped cylinder having chambers 446 and 448 of differing diameters. A differential area reciprocal piston means 458 having large 460 and small 462 diameter pistons formed thereon is mounted within the cylinder. Piston 458 is limited in its travel by means of stops 464 at the end of the larger cylinder 446 and end cap 466 at the end of the smaller diameter cylinder 448. The intermediate space 468 surrounding piston member 458 is vented to atmosphere through port 470. Throughout most of the piston travel, spaces 446 and 448 are isolated from one another, but during slack adjustment, fluid will flow between the two chambers as will be described.

Piston member 458 has threaded therein a valve unit 472 having a cylindrical bore 474, ball valve 476, valve seat 478, radial port 480, and a compression spring 482. The axial bore 474 also defines a check valve seat 484 within chamber 448.

Upon actuation of the service brakes, chamber 418 will be pressurized, and fluid motor diaphragm 410 cause displacment of the hydraulic piston 420 by means of push rod 414. As hydraulic piston 420 is displaced to the left, gasket means 486 will seal port 452 to prevent the escape of hydraulic fluid back into reservoir 450. Thereafter, the hydraulic fluid in working chamber 444 will be displaced into chamber 446. As this hydraulic fluid is displaced, it will force piston member 458 along its reciprocal path towards end cap 466. In doing so, the hydraulic fluid present in cylinder 448 will be displaced through hydraulic line 112 to brake cylinder 124. The volume of chamber 448, and the length of path travel of piston 458 are intended to provide the proper amount of slack adjustment for the brake cylinder. As piston member 458 traverses to the left, ball check means 476 is held on seat 478 by means of the pressure present in chamber 446, and the force exerted by spring 482. This ball check valve may provide a release function and allow flow from space 448 to space 446 if the pressure in chamber 448 exceeds that in 446 by more than a predetermined amount. In the preferred embodiment, spring 482 is selected to permit opening the valve upon development of a differential pressure in the order of 12 psi.

Ball check valve 476 may also be unseated mechanically by a push rod 488 which is carried by spider 490 mounted in the outlet port 492 of end cap 466. This push rod is effective to open the ball valve just before piston 458 reaches the limit of its leftward travel or approximately 1/16 of an inch before the piston abuts cover 466. This permits the flow of hydraulic fluid through axial passageway 474, in response to positive pressure differentials present in chambers 446 and 448. These positive pressure differentials actuate brake cylinder 124 to provide friction braking of the vehicle. Since the axial passageway 474 is now open, the pressure developed in the brake cylinders will be proportional to the pneumatic pressure developed in chamber 418.

Since the relative effective area of piston 460 is greater than the effective area of piston 462, piston 458 will be held in an extreme left hand position by means of the fluid pressure in chamber 446. At the same time, however, check valve disc 494 will be urged into contact with seat 484 by means of spring 496. During the service application of the brakes, the check valve disc 494 will be displaced to the left to allow hydraulic fluid to flow between the legs of spider member 490 into the outlet passage 492. When the service applicant is terminated, valve disc 494 will be firmly seated within seat 484, and will prevent any passage of fluid through axial passage 474. When the brakes are subsequently released, the pressure in space 444 and 446 must be reduced below the pressure in space 448 by an amount sufficient to offset the differential between the areas of piston portions 460 and 462 before the piston 458 will move back to its initial position. Spring means 442 will provide a positive displacement of piston 412, push rod 414, and hydraulic piston 420. This positive displacement by means of spring 442 will reduce the pressure in chambers 444 and 446 which will draw piston member 458 to the right as illustrated in FIG. 4. Normally, brake release is effected quickly enough to develop the pressure differential needed to shift piston 458 a sufficient distance to allow ball member 476 to reseat, therey closing passageway 474. The check valve means 494 will also impede the flow of hydraulic fluid through axial passageway 474 to chamber 446 until piston 458 has been retracted enough to allow ball valve 476 to reseat itself on seat 478. With this arrangement, the check valve 494 will always prevent flow from space 448 to space 446 whenever the ball valve is held open by means of push rod 488. As a result, the pressure differential required to shift piston 458 to the limiting right hand position will always be developed at the beginning of the brake release regardless of the rate at which pressure in working space 446 or 448 is dissipated.

The slack adjuster operates to compensate for improper adjustment in the following manner. If it is assumed that brake shoe clearance at the commencement of the application was too small, the amount of hydraulic fluid expelled from working space 446 will be conveyed from brake cylinder 124 into hydraulic working space 448 as the hydraulic piston 420 retracts. Hydraulic piston 420 will return to its fully retracted position before slack adjuster piston 458 reaches its limiting right hand position. This however, does not prevent piston 458 from moving to that limiting position because full retraction of the brake cylinder fully retract piston 458. As booster piston 420 reaches its fully retracted position, it reopens port 452, thereby allowing the remaining oil to be displaced from working space 446 and 444 into reservoir 450. As a result, the shoe clearance prevailing at the end of the brake release will be determined by the volumetric displacement of the slack adjuster piston 458 through chamber 448. Thus, cycling of the service brake under the assumed condition of too little shoe clearance will cause slack adjuster 400 to increase clearance to the desired value.

In cases where the service brake is applied when shoe clearance initially is greater than desired, slack adjuster piston 458 will reach its left hand limit of motion before the brake cylinders have brought their brake shoes into contact. Therefore, in this case, there is no increase in the pressure in working space 448 during the leftward movement of piston 458 and ball valve 476 remains closed until just before the piston 458 contacts end cap 466. At that point, the push rod 488 will unseat ball valve 476 so that additional hydraulic fluid required to take up the remaining shoe clearance and to develop the desired level of braking force can be transferred to the brake cylinder circuit through passage 474. Since the brake application causes piston 458 to move full stroke into engagement with end cap 466, it follows that the subsequent release of the service brake will cause piston 458 to withdraw from the brake cylinders exactly the same quantity of oil as in the case described earlier. Thus, it follows that in situations where shoe clearance initially is too great, the hydraulic slack adjuster 400 will reduce it to the desired valve.

It should be observed that when shoe clearance initially is too great, the quantity of hydraulic fluid displaced from chamber 444 will necessarily be greater than the quantity returned when the brakes are subsequently released. Therefore, during the release, the slack adjuster piston 458 will return to its initial position against abutment means 463 before booster piston 420 has reached its retracted position. Under this condition, oil will be transferred from reservoir 450 through port 454, working space 456, passageway 498 and check valve 500 to chamber 444. Check valve 500 comprises a valve disc having a seat member 502, a stem member 504, and a light coil compression spring 506. Hydraulic fluid is delivered to the check valve through the inclined passageway 498 which interconnects the cylindrical working space 456 with a chamber 508 formed in piston 420 immediately adjacent the upstream end of check valve 500. The angled passageway 498 is so sized that it develops the major portion of the pressure differential required to open valve 500. This design has a desirable side effect in that it affords the designer a convenient way to control the degree of suction which the booster piston 420 applies to the slack adjuster piston 458. Thus, in situation where it is desirable to use the booster suction to augment the retraction forces acting on the brake cylinders, the degree of assistance can be increased or decreased easily by merely reducing or increasing the diameter of passageway 498.

Hand Brake and Emergency Control System

The hand brake and emergency control system comprises (referring to FIGS. 1 and 2) a hand brake release valve 80 which is energized to apply the spring loaded brake actuator 408. The hand brakes are supplied with pneumatic pressure from the supply reservoir through conduit 54. This pressure restrains (referring to FIG. 4) the second fluid motor means 404 located in the pneumatic to hydraulic converter. Line 54 conveys high pressure air to hand brake release valve 80 and, via line 86, three-way valve 150, line 152 and line 154 into chamber 422, thus urging piston member 424 to the right to restrain motor means 408. When the pressure in chamber 172 is vented through hand brake release valve 80 or due to a loss in pressure from reservoir 44 as a result, for example, of separation of train sections A and B, spring motor 408 will drive the rigid diaphragm 424, bolt 432, push rod 426 and pressure plate 436 to the left. This will cause a simultaneous movement of piston 412, push rod 414, and hydraulic piston 420. The movement of piston 420 will effect the same hydraulic braking as previously described. It should be noted however, that the application of the hand brake results in a one time brake application which is normally equivalent to the effective force of spring motot means 408 applied across the face of hydraulic piston 420.

The interconnection of the hand brake vent valve 80, the reservoir 44 and the hand brake system is illustrated in FIG. 2. Air pressure is supplied to the hand brake system from reservoir 44 through conduit 54, and branch passageway 518 formed in the piping manifold. The hand brake release valve is energized to release, and when energized will pressurize the line 86. Incoming air from reservoir 44 enters through passageway 518, passes through axial bore 520 to intermediate chamber 522 and exits through exhaust passage 524 to conduit 86. Conduit 86 is in turn connected to each of the second fluid motor located in the pneumatic to hydraulic converters as shown in FIG. 1. When the hand brake is applied, solenoid 526 is de-energized, driving plunger 528 to the right thereby sealing the axial bore 520 and preventing the general venting of air from reservoir 44 through the exhaust port 84. Simultaneously, valve seat 530 opens annular passageway 532 which establishes communication between chamber 522 and interior pasageway 534 to allow internal passageway 524 to communicate with passageway 534 and exhaust port 84. Thus, the air pressure present in the hand brake system is exhausted through conduit 86 and the hand brake release valve 80 to the atmosphere at 84, thereby energizing the spring motors present in each of the hydraulic to pneumatic converters. As each of the spring motors is energized, it displaces the hydraulic piston 420, and thereby actuates the brake cylinders to effect a brake application on the vehicle.

It should be pointed out that this entire system is completely independent of the fluid or dynamic braking systems and may be actuated at any time to provide emergency or parking brake actuation from a single location in the train. It may be acutated as a parking brake when the vehicle is standing still, or be actuated as a "last ditch" emergency system when the car is in motion. The last-ditch braking may be accomplished by manually de-energizing valve 80, which simultaneously closes communication between reservoir 44 and the hand brake control line 86, while venting hand brake control line 86 to the atmosphere. Dual provisions are also included for manual release of the parking brakes in the event that air pressure is unavailable. Referring again to FIG. 4, this may be accomplished, on the one hand, by turning bolt 432 with a standard wrench. As bolt 432 is rotated, insert 430 is carried along the length of bolt 432 allowing displacement of push rod 426 to the right, while piston 424 remains in its extreme left hand position. The bolt 432 is advanced out until spring 442 retracts piston 420 enough to ease the hydraulic pressure imposed on the brake cylinders.

FIG. 4 illustrates a portion of the hand brake release system shown in FIG. 1, specifically that portion which, on the other hand, may be used for release of converters located in section A of the train or, alternately, for release of converters located in section B and C of the train. Each of the accumulator reservoir 162, 178 and 194 is sized to accumulate sufficient pressurized fluid to retract the spring motor located in the pneumatic-to-hydraulic converters a minimum of three times; however, the sizing of this reservoir may be adjusted to suit particular needs, such as in the case of a train having more then three sections. Cut out valves 150, 166 and 182 are normally placed in the position shown in FIG. 4 in which fluid under pressure may flow from line 86 through line 144 and to the converters via lines 154 and 156, for example. When pneumatic motors 404 are pressurized, reservoirs 162, 178 and 194 are simultaneously pressurized via check valves 160, 176 and 192. If spring motor 408 should happen to be applied due to a loss of pressure in line 144 as a result of the de-energization of hand brake release valve 80 or separation of the sections, the spring motor may be pneumatically retracted as follows: Assuming that only the hand brakes in section A have been applied, three way valve 150 would be manually turned to provide communication from pneumatic line 164 to pneumatic line 152, whereby the spring applied brakes in converters A1 and A2 would be retracted. Alternately, if the spring applied brakes in one of the other sections have been applied, and no other pressure is available, three way valve 150 may be positioned to permit communication from pneumatic line 164 to pneumatic line 144, whereby brake retracting pressure is delivered to sections B and C in the usual manner. Similarily, accumulator reservoirs 178 and 194 in sections B and C may be selectively connected to the converters in their respective sections or to the converters in one or both of the remaining sections. The provision of this unique hand brake release system ensures that the hand brakes in the individual sections or in the entire train may be quickly released as necessary to move a disabled section or to move a section which has broken away from the remainder of the train.

While I have thus described the preferred embodiments of the present invention, other variations will be suggested to those skilled in the art. It must be therefore understood that the foregoing description is meant to be illustrative only and not limitive of the present invention; and all such variations and modifications as are in accord with the principles described herein, are meant to fall within the scope of the appended claims.

Having thus described my invention, I claim:

1. An electro-pneumatic brake system for use in rail cars having at least one axle with both friction and dynamic braking means and at least one axle with only friction braking means, comprising:
   means for producing a first fluid pressure signal proportional to the load carried by the rail car;
   means for producing a first electrical signal proportional to any dynamic brake application force provided at said at least one axle with both friction and dynamic braking means;
   fluid pressure responsive means for simultaneously applying essentially equivalent friction braking pressure to the friction braking means at all axles; and
   control valve means, responsive to said first fluid pressure signal, said first electrical signal and the pressure applied to said fluid-pressure-responsive means for simultaneously applying essentially equivalent friction braking pressure, for regulating the pressure applied to said friction braking means at all said axles.

2. A brake system as claimed in claim 1, wherein said means for simultaneously applying friction braking pressure comprises:
   at least one primary fluid motor responsive to variations in the fluid pressure received from said control valve means to actuate said friction braking means;
   a source of fluid pressure;
   at least one secondary fluid motor responsive to variations in the fluid pressure received from said source of fluid pressure;
   at least one spring motor means operatively connected to said friction braking means and restrained by said at least one secondary fluid motor, said spring motor being released by reductions in the pressure received from said source of fluid pressure, thereby to actuate said friction braking means; and
   means operatively connected to said source of fluid pressure and said secondary fluid motor for selectively accumulating pressurized fluid from said source of fluid pressure and delivering said accumulated pressurized fluid to said secondary fluid motors in the event of a loss in pressure from said source of fluid pressure.

3. A brake system as claimed in claim 2, wherein said rail cars comprise a plurality of articulated sections, the axles in some sections including both friction and dynamic braking means and in other sections including only friction braking means and wherein the means for accumulating and delivering pressurized fluid comprises:
   a fluid pressure line extending from said source of fluid pressure through each section and communicating with said at least one secondary, fluid motor;
   an accumulator reservoir communicating with said fluid pressure line via a check valve whereby pressurized fluid may be accumulated; and
   a three way valve communicating with said accumulator reservoir and said fluid pressure line whereby said pressurized fluid may be delivered to said fluid pressure line for retracting said at least one spring motor means in the event of a loss in pressure from said source of fluid pressure.

4. A brake system as claimed in claim 3, wherein an accumulator reservoir and three way check valve are located in each of said sections.

5. A brake system as claimed in claim 2 further comprising means for venting said at least one secondary fluid motor to effect a parking or emergency brake application.

6. A brake system as claimed in claim 3, further comprising means for venting said at least one secondary fluid motor to effect a parking or emergency brake application.

7. A brake system as claimed in claim 4, further comprising means for venting said at least one secondary fluid motor to effect a parking or emergency brake application.

8. A brake system as claimed in claim 1, wherein said rail car comprises a plurality of articulated sections, the axles in some sections including both friction and dynamic braking means and in other sections including only friction braking means.

9. A brake system as claimed in claim 8, wherein said means for simultaneously applying friction braking pressure comprises:
   at least one primary fluid motor responsive to variations in the fluid pressure received from said control valve means to actuate said friction braking means;
   a source of fluid pressure;
   at least one secondary fluid motor responsive to variations in the fluid pressure received from said source of fluid pressure;

at least one spring motor means operatively connected to said friction braking means and restrained by said at least one secondary fluid motor, said spring motor being released by reductions in the pressure received from said source of fluid pressure, thereby to actuate said friction braking means, and means operatively connected to said source of fluid pressure and said secondary fluid motor for selectively accumulating pressurized fluid from said source of fluid pressure and delivering said accumulated pressurized fluid to said secondary fluid motors in the event of a loss in pressure from said source of fluid pressure.

10. A brake system as claimed in claim 9, wherein a means for selectively accumulating and delivering pressurized fluid is located in each of said sections.

11. A brake system as claimed in claim 9, further comprising means for venting said at least one secondary fluid motor to effect a parking or emergency brake application.

\* \* \* \* \*